No. 751,045. PATENTED FEB. 2, 1904.
J. E. BILBY & R. R. KEFFER.
WAGON BODY.
APPLICATION FILED NOV. 1, 1902.
NO MODEL. 2 SHEETS—SHEET 1.
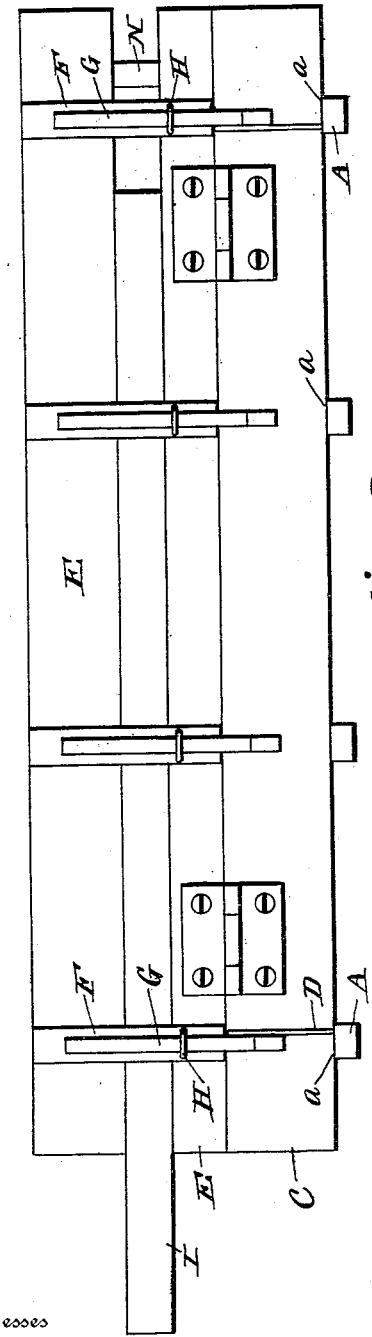
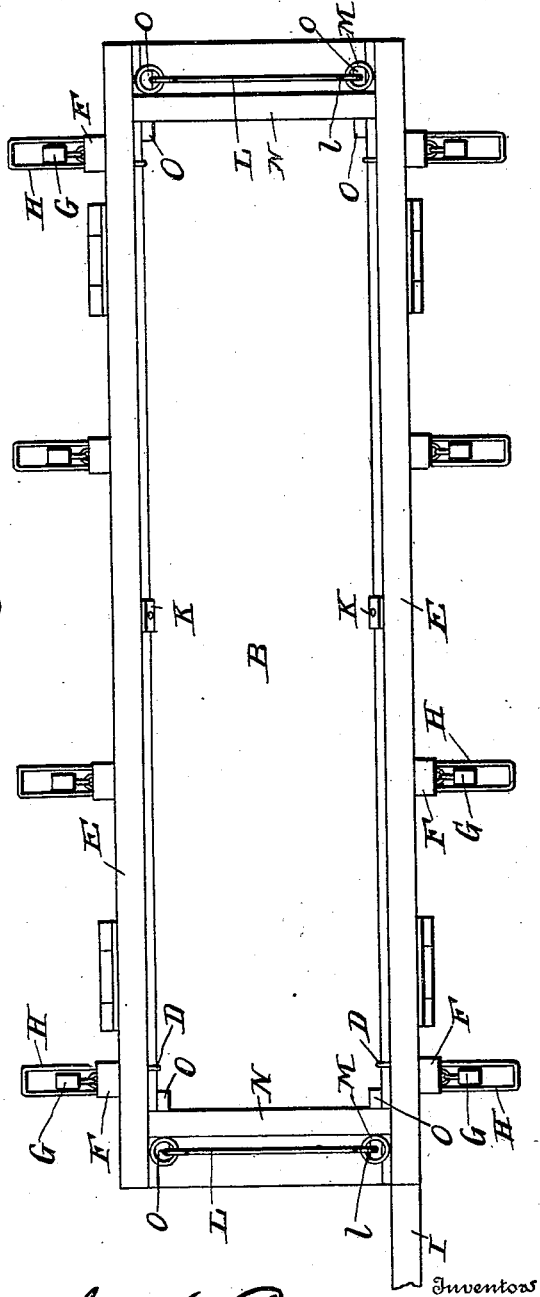
Witnesses
Inventors
John E. Bilby
Robert R. Keffer
by D. A. Tourier
Attorney No. 751,045. PATENTED FEB. 2, 1904.
J. E. BILBY & R. R. KEFFER.
WAGON BODY.
APPLICATION FILED NOV. 1, 1902.
NO MODEL. 2 SHEETS—SHEET 2.
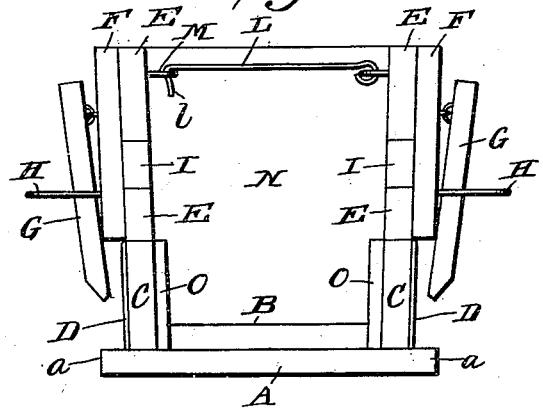
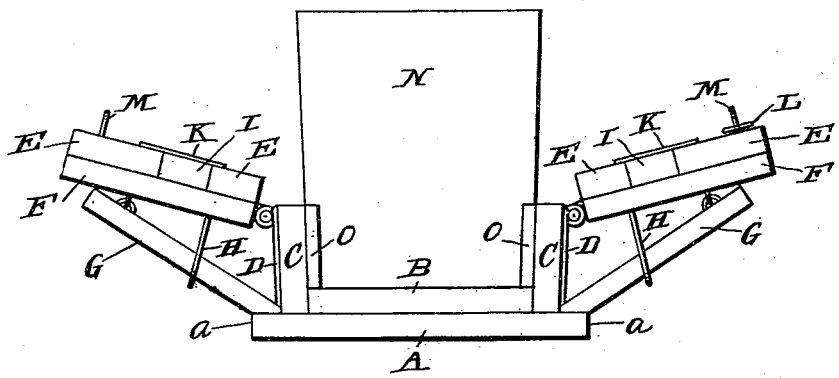
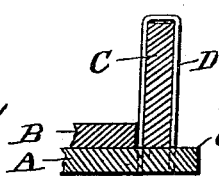
Witnesses
Jos. H. Blackwood
J. H. Randolph, Jr.
Inventors
John E. Bilby
Robert R. Keffer
by D. A. Gowrick
Attorney No. 751,045. Patented February 2, 1904.

UNITED STATES PATENT OFFICE.

JOHN E. BILBY AND ROBERT R. KEFFER, OF SKIDMORE, MISSOURI.

WAGON-BODY.

SPECIFICATION forming part of Letters Patent No. 751,045, dated February 2, 1904.

Application filed November 1, 1902. Serial No. 129,710. (No model.)

*To all whom it may concern:*

Be it known that we, JOHN E. BILBY and ROBERT R. KEFFER, citizens of the United States, and residents of Skidmore, in the county of Nodaway, in the State of Missouri, have invented certain new and useful Improvements in Wagon-Bodies, of which the following is a specification.

Our invention relates to wagon-bodies for agricultural uses, and has for its objects to provide a body that has hinged side-boards that are adapted to be held in an upright position and removable and replaceable end-boards forming a tight box-like receptacle that will hold grain, meal, flour, &c., and when lowered into a substantially horizontal position form a hay or fodder carriage. The side pieces are also provided with removable slats that may be removed when the side pieces are in the upright position to form a box for hauling live stock.

Our invention is especially adapted to use on stock-farms, the fodder being loaded in the field and carried to the mill on the wagon arranged for a hay or fodder carriage, where after the fodder has been unloaded the sides are elevated and the wagon driven under the mill delivery-spout to receive the ground meal, which can then be taken directly to the feeding-yard and given to the cattle.

By the use of our invention the necessity for two wagons—one to convey the fodder to the mill, the other to carry the ground meal to the feeding-yard—is substituted by the use of one wagon which carries a load both ways, thus saving in the expense by dispensing with the necessity of having the number of wagons formerly employed as well as the animals necessary to operate them and the men to drive the wagons.

The advantages of our invention will fully appear hereinafter and by reference to the accompanying drawings, in which—

Figure 1 is a side view in elevation of our invention, showing the side-boards in an upright position and the slat partly withdrawn; Fig. 2, a top plan view of the wagon in the same position; Fig. 3, an end view showing the side pieces in a raised position; Fig. 4, a similar view showing the side pieces lowered to form a hay-rack, and Fig. 5 a detail view showing one of the loops for securing the side-boards to the cross-pieces.

Referring to the drawings, in which similar reference characters indicate corresponding parts throughout the several views, A represents cross-pieces on which the floor B is secured, and C side-boards secured to said cross-pieces by means of loops D and nailing to floor B.

E represents the side pieces hinged to side-boards C.

F represents cleats secured to said side pieces E, on which are pivoted arms G to support said side pieces when lowered to form a hay or fodder carriage, the ends of said arms resting on the extended ends $a$ of cross-pieces A and against side-boards C when the side pieces E are lowered, H being loops to limit the movement of the arms and to insure that they are at a proper height when lowered to rest upon said cross-pieces, thus saving the operator the necessity of adjusting each separate arm.

I represents a slat loosely mounted in each side piece E and adapted to be removed when it is desired to use the wagon to carry stock, K being straps on the inner side of said side pieces to hold the slat against the cleats F.

The side pieces E are held in a raised position by means of rods L, having hooked ends $l$ adapted to register with staple or loop M. If desired, a chain may be substituted for rod L, having a hook at its end to be secured in staple or loop M.

N represents the end-boards, held in place by means of cleats O on the side-boards C.

Having thus described our invention, what we claim is—

1. In a wagon-body, side pieces hinged to swing between an upright and a substantially horizontal position, said side pieces consisting of fixed pieces set apart from one another and secured to cleats, a slat adapted to be inserted between said fixed pieces, arms hinged to said cleats to support said side pieces when in a substantially horizontal position, and U-shaped loops secured to said cleats and inclosing said swinging arms to limit the swinging thereof and insure that they simultaneously assume a supporting position, substantially as shown and described.

2. In a wagon-body, the floor and sideboards supported by cross-pieces having extended ends, side pieces hinged to said sideboards and adapted to swing between an upright and a substantially horizontal position, said side pieces consisting of fixed pieces set apart from one another and secured to cleats, a slat adapted to be inserted between said side pieces when in a substantially horizontal position, arms hinged to said side pieces and adapted to rest upon the extended ends of said cross-pieces, and U-shaped loops secured to said cleats and inclosing said swinging arms to limit the swinging thereof and insure that they simultaneously assume a supporting position, substantially as shown and described.

3. In a wagon-body, the floor and sideboards supported by cross-pieces having extended ends, side pieces hinged to said sideboards and adapted to swing between an upright and a substantially horizontal position, a hooked rod pivotally mounted near the ends of said side-boards, loops near the ends of said side-boards opposite the hooked rod to receive the hooked end thereof, arms hinged to said side pieces and adapted to rest upon the extended ends of said cross-pieces, and U-shaped loops secured to said side pieces and inclosing said swinging arms to limit the swinging thereof and insure that they simultaneously assume a supporting position, substantially as shown and described.

4. In a wagon-body, cross-pieces having extended ends, the floor secured to said cross-pieces, the side-boards nailed to said floor and secured to said cross-pieces by loops, side pieces hinged to said side-boards and adapted to swing between an upright and a substantially horizontal position, arms hinged to cleats on the side pieces and adapted to rest upon the extended ends of said cross-pieces, said arms adapted to swing freely from said cleats, and U-shaped loops secured to said cleats and inclosing said swinging arms to limit the swinging thereof and insure that they simultaneously assume a supporting position, substantially as shown and described.

5. In a wagon-body, cross-pieces or bolsters, the floor secured to said bolsters, side-boards secured to said floor, vertical loops D inclosing said side-boards and secured to said bolsters, side pieces hinged to said side-boards consisting of boards spaced apart and secured to vertical cleats, slats removably and replaceably mounted between said boards, arms pivoted near their upper ends to said cleats and adapted to rest on the extended ends of said bolsters when the side pieces are in a lowered position, a U-shaped loop H secured to each cleat and inclosing the arm hinged thereto to limit the swinging of said arm, a hooked rod pivotally mounted near one end of each side piece, and a loop near the other end of the side piece opposite said hooked rod, and end-gates removably and replaceably mounted in each end of the body, substantially as shown and described.

In testimony whereof we hereto affix our signatures in the presence of two witnesses.

JOHN E. BILBY.
ROBERT R. KEFFER.

Witnesses:
FREDERICK L. HAYNES,
JOHN CARR.